United States Patent
Alcorn et al.

(10) Patent No.: US 9,088,233 B2
(45) Date of Patent: Jul. 21, 2015

(54) SYSTEMS AND METHODS FOR REDUCTION OF MOTOR JITTER WHILE DRIVING AN ELECTRIC MOTOR

(71) Applicant: Allegro Microsystems, LLC, Worcester, MA (US)

(72) Inventors: William Boyd Alcorn, Boylston, MA (US); Chee-Kiong Ng, Acton, MA (US); William P. Taylor, Amherst, NH (US)

(73) Assignee: Allegro Microsystems, LLC, Worcester, MA (US)

( * ) Notice: Subject to any disclaimer, the term of this patent is extended or adjusted under 35 U.S.C. 154(b) by 142 days.

(21) Appl. No.: 13/718,549

(22) Filed: Dec. 18, 2012

(65) Prior Publication Data
US 2014/0167666 A1    Jun. 19, 2014

(51) Int. Cl.
*H02P 6/10* (2006.01)
*H02P 6/14* (2006.01)
*H02P 6/18* (2006.01)

(52) U.S. Cl.
CPC ........ *H02P 6/10* (2013.01); *H02P 6/147* (2013.01); *H02P 6/182* (2013.01)

(58) Field of Classification Search
CPC ............. H02P 6/06; H02P 6/10; H02P 6/165; G05B 23/0283
USPC .......... 318/400.23, 400.32, 400.11, 716, 442, 318/807, 809, 430, 431, 814, 800, 806, 802
See application file for complete search history.

(56) References Cited

U.S. PATENT DOCUMENTS

| | | | |
|---|---|---|---|
| 6,420,847 B1 | 7/2002 | Galbiati et al. | |
| 2006/0125439 A1* | 6/2006 | Ajima et al. | 318/716 |
| 2010/0171452 A1* | 7/2010 | Fukushima | 318/400.11 |

OTHER PUBLICATIONS

PCT Search Report and Written Opinion of the ISA dated Sep. 2, 2014; for PCT Pat. App. No. PCT/US2013/040703.

* cited by examiner

*Primary Examiner* — Karen Masih
(74) *Attorney, Agent, or Firm* — Daly, Crowley, Mofford & Durkee, LLP (57) ABSTRACT

An apparatus for driving a motor comprises a drive signal generation circuit configured to produce pulses on a pulse-width modulated drive signal in response to a control signal. A detection circuit is coupled to receive a commutation signal from the motor to monitor the speed of the motor. A control signal generation circuit is configured to dynamically generate the control signal so that a frequency of pulse-width modulated drive signal corresponds with the duration of the phase of the motor, so as to reduce the occurrence of an incomplete pulse on the drive signal. Methods for driving a motor are also disclosed.

24 Claims, 7 Drawing Sheets

SYSTEMS AND METHODS FOR REDUCTION OF MOTOR JITTER WHILE DRIVING AN ELECTRIC MOTOR

FIELD

This disclosure relates to circuits, systems, and processes for driving a motor and, more specifically, to the reduction of motor jitter while driving a motor.

BACKGROUND

Circuits to precisely control, drive, and regulate brushless DC (BLDC) electric motors are required in many applications. These circuits often create pulse-width modulated (PWM) drive signals that are used to control power to the motor.

As is known, BLDC motors may include multiple coils. These coils, when energized, cause the motor to turn. However, in order for the motor to continuously turn, a motor controller circuit may have to energize one or more (but not all) of the coils at a time, energize the coils in a particular order, energize the coils in a forward and backward direction at different times, etc. The periods of time in which the coils are energized are often referred to as so-called "phases" of the motor.

The sequence and timing of which coils are energized is dependent upon the design of the BLDC motor. As an example, a particular BLDC motor may have three coils that must be energized in sequence, i.e. a round-robin fashion, in order to turn the motor. Such a motor may have three "phases." In each phase, a different one or more of the three coils is energized. As the motor turns, the phase will change, and the motor driver will energize the next one or more coils in order to keep the motor spinning.

Some known electric motor drive circuits are described in U.S. Pat. No. 7,590,334, issued Sep. 15, 2009; U.S. Pat. No. 7,747,146, issued Jun. 29, 2010, U.S. patent application Ser. No. 13/271,723, filed Oct. 12, 2011; and U.S. patent application Ser. No. 13/595,430, filed Aug. 29, 2012, each of which is incorporated here by reference, and each of which is assigned to the assignee of the present invention.

In certain motor applications, it is desirable to minimize motor jitter, i.e. an undesired deviation from true periodicity of an assumed periodic signal of the motor. In other words, jitter may be a tendency for the motor speed, or a signal representing the motor speed, to inadvertently or unexpectedly change or fluctuate. Jitter can be caused by various stimuli. For example, an incomplete or short pulse (i.e. a pulse with a shorter than normal duration) on a PWM drive signal can cause the amount of power applied to the motor to fluctuate, and thus cause the speed of the motor to fluctuate.

In view of the above, it would be desirable to provide a motor control circuit and associated method that can reduce the occurrence of motor jitter.

SUMMARY

The present invention provides a motor control circuit & associated method that can reduce the occurrence of motor jitter.

In an embodiment, a method for driving a motor includes generating a pulse-width modulated (PWM) drive signal for controlling power to the motor. A control signal to control the frequency of pulses on the pulse-width modulated drive signal is also generated. The duration of the phases of the motor are monitored, and the frequency of the pulses is set to a value associated with the duration of the phase of the motor, so as to reduce the occurrence of an incomplete pulse on the drive signal.

In an embodiment of the method, additional control signals for generating pulses on the pulse-width modulated drive signal are generated and, when the phase of the motor changes, the control signal being used to generate the pulses can be switched.

In another embodiment, an electronic circuit for driving a motor comprises a drive signal generation circuit configured to produce pulses on a pulse-width modulated drive signal in response to a control signal. A detection circuit coupled to receive a commutation signal from the motor and monitor a duration of a phase of the motor is also included. A control signal generation circuit is configured to dynamically generate the control signal so that a frequency of the pulses to a value that corresponds with the duration of the phase of the motor, so as to reduce the occurrence of an incomplete pulse on the drive signal.

In an embodiment of the electronic circuit, one or more additional PWM generator circuits for generating the pulses on the pulse-width modulated drive signal are included, and the driver signal generator circuit is configured to alternate between which control signal is used to generate the pulses on the pulse-width modulated drive signal.

BRIEF DESCRIPTION OF THE DRAWINGS

Like numbers in the drawings denote like elements. Connectors within circuit or block diagrams may represent single wires, buses, or other types of connections between blocks. A single connector line should not be construed to limit the type of connection to a single wire.

The figures, including the flowcharts and block diagrams, are provided for exemplary purposes and are not intended to limit the scope of this disclosure. Although the figures depict diagrams and flowcharts with particular numbers of blocks connected in particular arrangements or sequences, these are examples only. Other arrangements and sequences are within the scope of this disclosure.

DETAILED DESCRIPTION

Before describing the present invention, some introductory concepts and terminology are explained. As used herein, the term "magnetic field sensing element" is used to describe a variety of electronic elements that can sense a magnetic field. The magnetic field sensing element can be, but is not limited to, a Hall effect element, a magnetoresistance element, a magnetotransistor, or a resolver, for example.

As known in the art, a spinning motor can act like a generator. The electromotive force produced by the spinning motor may be referred to as back-EMF. Signals produced by this back-EMF can be measured to determine the position and speed of the motor. For example, the magnitude of the back-EMF signals may be directly proportional to the speed of the motor. In some instances, these signals can be measured without the need for an external sensor. In these so-called "sensorless systems," the back-EMF signals may be fed back directly from the motor into an input of the motor driver circuit.

As is known, different types of Hall effect elements can also be used to measure position and speed of the motor. These Hall effect elements include, for example, a planar Hall element, a vertical Hall element, and a circular vertical hall (CVH) element. As is also known, there are different types of magnetoresistance elements, for example, a semiconductor magnetoresistance element such as Indium Antimonide (InSb), a giant magnetoresistance (GMR) element, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb), or another compound semiconductor material, or high mobility material, for example GaN.

As used herein, the term "magnetic field sensor" is used to describe a circuit that includes a magnetic field sensing element. Magnetic field sensors are used in a variety of applications, including, but not limited to, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet, and a magnetic field sensor that senses a magnetic field density of a magnetic field.

As used herein, the term "signal" is used to describe an electronic characteristic, analog or digital, that can change over time. In contrast, as used herein, the term "value" is used to describe a digital electronic value that tends to be static, or that tends to change from time to time. However the terms signal and value can be used interchangeably.

As used herein, the term "demand" or "demand signal" is used to describe any electronic signal, analog or digital, that controls an amount of power applied to a motor. For example, as the demand signal changes, the amount of power applied to a motor may also change.

As used herein, the terms "software" and "firmware" may refer to computer readable instructions, stored in a volatile or non-volatile computer readable storage medium (such as a hard drive or memory). The computer readable instructions may be stored in a ROM, RAM, or other type of memory included on a silicon chip. The silicon chip may, in an embodiment, be a magnetic field sensor circuit that includes or access the memory. In some embodiments, the computer readable instructions may be stored in a fused ROM memory on a silicon chip that can be programmed during manufacturing. Although described as "computer-readable," the instructions need not be accessed or executed by a traditional laptop or desktop computer. Rather, the computer-readable instructions may be accessed or carried out by any type of processor or circuit that is able to read and execute the instructions.

The computer readable instructions, when executed by a processor or circuit, may cause the processor or circuit to perform operations and/or processes described below. The terms "software" and "firmware" may also refer to other types of instructions such as microcode, machine-code, scripts, or any type of computer readable instruction set that can be stored in a computer readable storage medium and executed by a processor or circuit.

Figure 1:
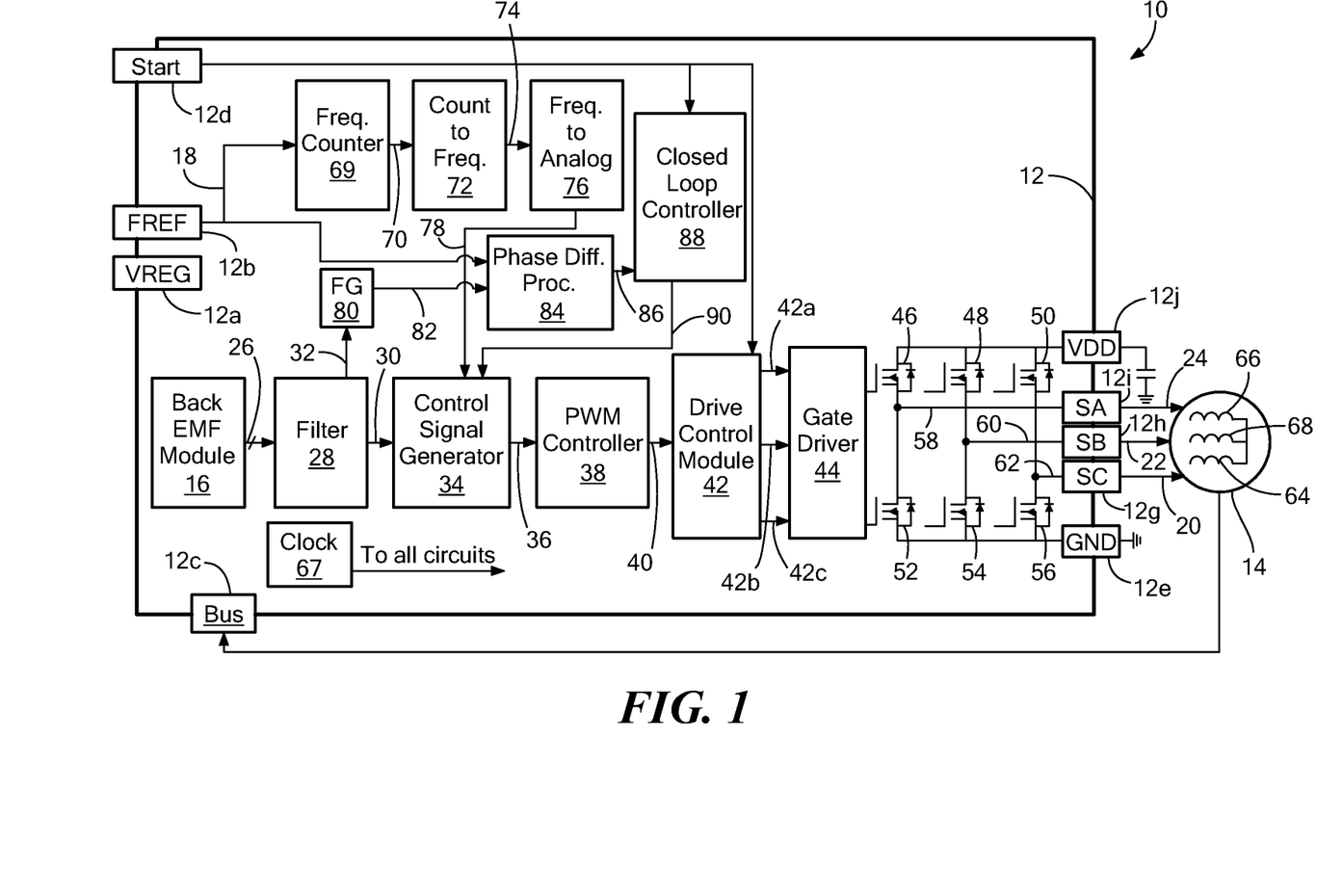
FIG. 1 is a circuit diagram of an electronic circuit for driving a motor.

Referring to FIG. 1, a motor drive arrangement 10 is shown that includes an exemplary electronic circuit 12 coupled to an electric motor 14 and to a Back-EMF module 16. In some embodiments, the electronic circuit 12 may be a silicon chip, or other electronic circuit material. The chip may include a silicon die having integrated circuitry that implements, in whole or in part, the systems and methods described below. The die may be placed on a leadframe and encapsulated by a package having one or more pins that interface with external circuitry, although other electronic die packaging techniques commonly used are also possible and are known to those of ordinary skill in the art. In other embodiments, the electronic circuit 12 may be implemented as software, as other types of circuitry (e.g. FPGA, discrete components, etc), or as a combination of software and circuitry. Additionally, the systems and methods described may be implemented in whole or in part by an electronic circuit, or may be implemented in whole or in part by a processor executing computer readable instructions, such as microcode, firmware, software, or the like. In the latter embodiment, the instructions may be stored in a computer-readable volatile or non-volatile memory and/or computer readable storage medium (i.e. RAM, ROM, flash memory, CD media, DVD media, and the like) and, when executed by the processor, may cause the processor to perform certain operations for controlling the speed of the motor 14.

The embodiment shown in FIG. 1 displays the back-EMF circuitry as a module integrated into the electronic circuit 12. The back-EMF module 16 may be a receiver or other circuit configured to receive back-EMF signals from the windings of the motor 14. However, in embodiments of the electronic circuit 12, the back-EMF module 16 may be a separate die, module, package, or component. In other words, the back-EMF module 16 may be a separate sensor or component used to detect the position and speed of the motor 14. In such embodiments of the technology, back-EMF signals from windings of the motor 14 may be coupled directly from the motor 14 to the separate back EMF module 16. In other embodiments, circuitry to receive the back-EMF from the motor 14 may be incorporated into the electronic circuit 12, into the motor 14, or into a separate die, module, package, or component.

In embodiments of the system, the back-EMF module 16 may be replaced by other sensors or circuits that can measure the speed or position of the motor 14 including, but not limited to, an array of magnetic field sensors, one or more resolvers, or any other device or sensor that can measure the position, frequency, or speed of the motor 14. The magnetic field sensors, resolvers, or other devices and sensors may either be integrated into the electronic circuit 12, or may be a separate die, module, package, or component that can be coupled to the electronic circuit 12. For simplicity, block 16 will simply be referred to as back-EMF module 16.

Pin 12a, a regulated voltage pin (VREG), is coupled to receive a regulated voltage from a voltage regulator or other type of power supply outside of the electronic circuit 12 (not shown). The regulated voltage, or alternatively, a regulated current, is provided to the back-EMF module 16, and to some or all of the circuitry within the electronic circuit 12. In another embodiment an integrated circuit die may include a voltage regulator circuit on the same die as the circuit 10 of FIG. 1. In such cases the Vreg pin 12a may be excluded from the final die or package depending on the exact design and voltage requirements.

Pin 12b, a frequency reference pin (FREF), is coupled to receive a frequency reference signal 18 from outside of the electronic circuit 12. If, for example, the electronic circuit 12 is installed in a printer and the motor 14 is a motor within the printer, the frequency reference signal 18 may be supplied by other {?} circuitry (not shown) within the printer and may represent, for example a desired final speed of the motor 14. At different times, the printer may require different motor speeds. For example, a high quality printout mode of the printer may require relatively slower motor speeds while a draft printout mode may require relatively faster motor speeds. Accordingly, the frequency reference signal 18 may be a variable signal, and may change according to requirements of the external circuitry. In an embodiment, the frequency reference signal 18 may represent a desired final speed of the motor 14 and may be referred to as a speed control signal.

The frequency reference signal 18 can be an analog signal, a digital signal, a square wave, a sine wave, a pulse-width modulated signal, or any type of signal that can represent a desired motor speed. In an embodiment, the frequency reference signal 18 may be a sine or square wave oscillating at a frequency that represents the desired motor speed. As described in greater detail below, functions of the electronic circuit 12 can be synchronized with the frequency reference signal 18. In other embodiments the frequency reference signal may be a voltage or current input. In such cases the circuitry required to convert from the frequency of the input signal to a voltage or current is not required. In another embodiment the frequency reference signal may be a digital word that can be converted into a voltage signal by a digital-to-analog converter, for example Pins 12c are shown as a bus coupled to receive back-EMF signals from the motor 14 and feed them to the back-EMF module 16. These signals may be a counter-electromotive force produced by the windings of the motor 14. In such an arrangement, the back-EMF signals received by pins 12c may be used indicate the position and frequency or speed of the motor 14.

Although shown as a single pin 12c, the electronic circuit 12 may include multiple input pins to receive signals from the back-EMF module 16. If the motor 14 includes three windings, for example, then the electronic circuit 12 may have three input pins, one for each winding, to receive back-EMF signals from the individual windings. In other embodiments, the input pins may be coupled to receive back-EMF signals from a subset of the motor windings. For example, if the motor has six windings, there may be an input pin coupled to every other winding, for a total of three input pins. Because back-EMF signals are produced by windings of the motor 14, the back-EMF signals received by the input pins 12c can be used to determine the position and speed of the motor 14.

Pin 12d, a start pin (START), is coupled to receive a control signal from outside of the electronic circuit 12. The control signal can start and stop the functions of the electronic circuit 12, and therefore, start and stop the electric the motor 14.

Pin 12e, a ground pin (GND), provides a power supply ground for the electronic circuit 12.

Pins 12g, 12h, 12i, motor drive signal pins (SC, SB, SA, respectively), are coupled to provide PWM drive signals 20, 22, and 24 to the electric the motor 14.

Pin 12j, an upper supply pin (VDD), is coupled to receive an upper power supply voltage from outside of the electronic circuit 12.

Figure 1A:
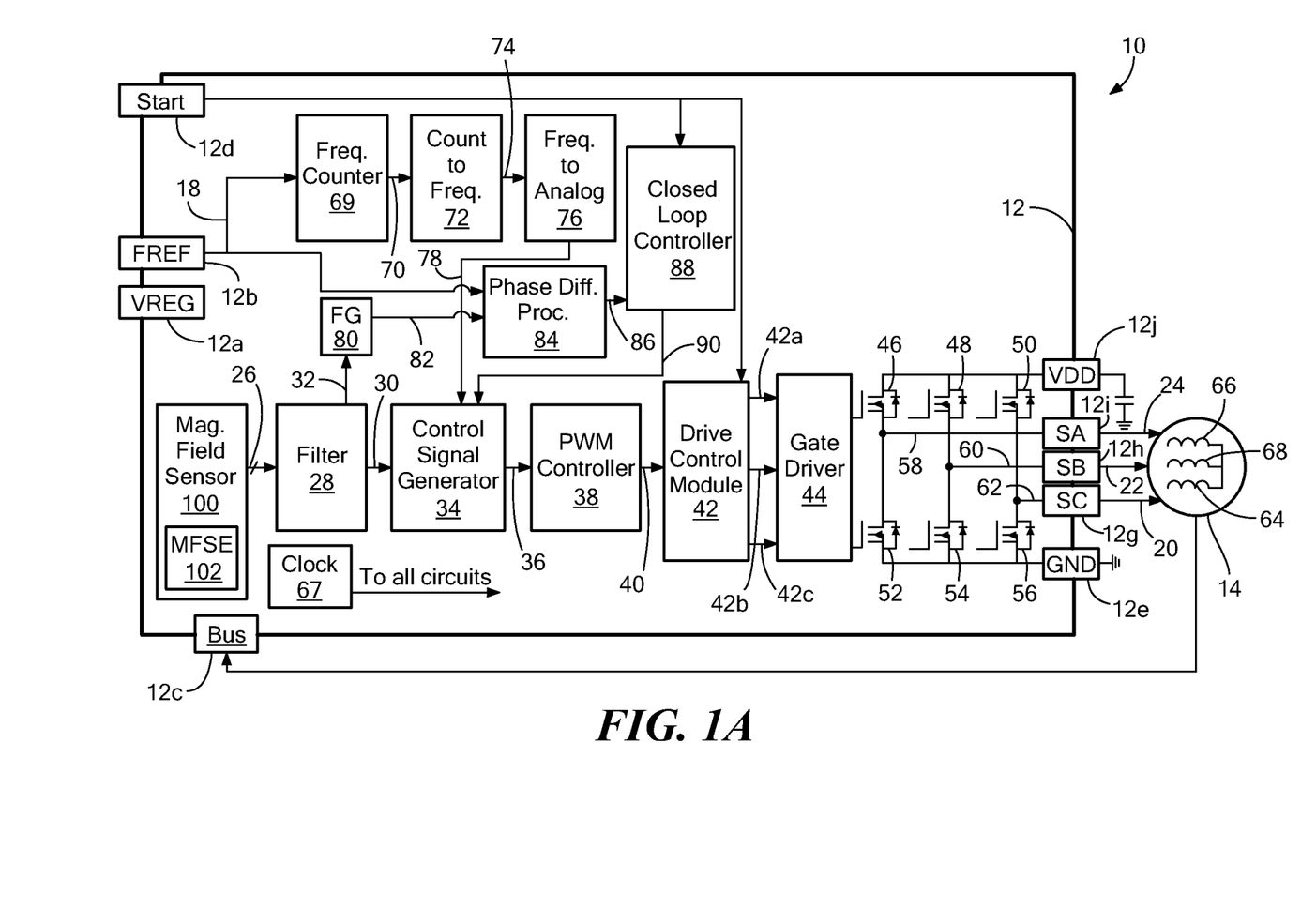
FIG. 1A is a circuit diagram of an electronic circuit for driving a motor.

If the back-EMF module 16 is replaced with one or more magnetic field sensors 100 (as shown in FIG. 1A), magnetic field sensing elements 102 within the magnetic field sensor may be positioned to sense magnetic fields, and, in particular, varying magnetic fields, of magnets within the motor 14 as a shaft of the motor 14 rotates. In one particular embodiment, three magnetic field sensing elements or magnetic field sensors can be disposed at positions relative to the motor 14 that are one hundred twenty degrees apart about an axis of rotation of the shaft of the electric motor. In another embodiment, six magnetic field sensors disposed at positions relative to the motor 14 that are sixty degrees apart about the axis of rotation. In the case where there are six pole pairs, the frequency of the signals from the magnetic field sensors (in Hz) will be about ten (10) times greater than the rotations per minute of the motor 14. In general, the magnetic field sensors may be arranged so that the frequency of signals from the magnetic field sensors is proportional to the speed of the motor 14. This known proportionality can be used to translate the frequency of the signals from the magnetic field sensor into a signal representing the speed of the motor 14. Accordingly, any desired number of magnetic field sensors may be used.

In some embodiments the magnetic field sensor may be a Hall effect based sensor, while other embodiments may utilize giant magnetoresistance (GMR), linear spin-valve, magnetic tunnel junction (MTJ), anisotropic magnetoresistance (AMR) or other magnetic field sensors. The use of a transducer that can produce an electronic signal which represents a magnetic field is applicable to this application provided the operating range of the magnetic field sensor or transducer is appropriate to result in operation of the present invention.

In various embodiments of the technology, the back-EMF module 16 generates position signals 26 which may be converted to digital signals and received by a digital filter 28. In other embodiments, the position signals 26 may be filtered by analog filters (not shown) and may not be converted to digital signals. The position signals 26 are generally analog signals, and each is representative of an angle of rotation of the shaft of the motor 14. The position signals 26 may be referred to as commutation signals. A commutation signal may be any signal that can be used to monitor speed, position, and/or frequency of the motor 14, or any other attribute of the motor 14 that can be used to regulate the speed of the motor 14.

Conversion to digital signals is not shown in FIG. 1, but it is presumed that the position signals 26 may be converted to digital signals before they reach digital filter 28 or within the digital filter 28. The digital filter 28 is configured to generate filtered signals 30 and 32, which are representative of the position signals 26. The filtered signals 30 and 32 can be, for example, multi-bit digital signals. The filtered signals 30 and 32 may also represent the angle of rotation of the shaft of the electric the motor 14.

A control signal generator 34 is coupled to receive the signals 30 and produce a PWM signal 36. The PWM signal 36 may be a signal that can be used to control the speed of the motor 14. A pulse-width modulation (PWM) controller 38 may receive the PWM signal 36 and use the PWM signal 36 to generate pulses on a PWM drive signal 40. The PWM signal 36, the PWM controller 38, and the PWM drive signal 40 will be discussed below in greater detail.

A drive control module 42 can receive the PWM drive signal 40 and use it to produce one or more drive signals 42a, 42b, and 42c. A gate driver circuit 44 is coupled to receive the drive signals 42a-42c and configured to drive the gates of FETs 46, 48, 50, 52, 54, and 56.

The three high side field effect transistors (FETs) 46, 48, and 50 and the three low side FETs 52, 54, and 56 operate in saturation with pulse width modulation, and thus, consume only a small amount of power.

The arrangement of the FETs 54-64 is configured to generate three drive signals 58, 60, and 62, which are coupled to ends of respective ones of windings 64, 66, and 68 within the electric the motor 14. In an embodiment, the other ends of the windings 64, 66, and 68 can be coupled together so that the FETs 54-64 can drive current through the windings in either direction in order to control the speed and position of the motor 14.

A clock circuit 67 provides a clock signal 38*a* to some or all portions and circuits within electronic circuit 12. In other embodiments an external clock could be used and in such a case a pin on the package or input to the circuit on the die would be needed.

The electronic circuit 12 can also include a frequency counter 69 that receives the frequency reference signal 18. The frequency counter 69 may produce a digital count signal 70 that represents the frequency of the frequency reference signal 18. In an embodiment, the count signal 70 may be the number of clock pulses from the clock circuit 67 that occur during one cycle of the frequency reference signal 18.

The digital count signal 70 may be received by a count-to-frequency module 72 that converts the digital count signal 70 into a frequency signal 74. A frequency to analog module 76 may then convert the frequency signal 74 into an analog voltage signal 78. In an embodiment, a higher voltage of the analog voltage signal 78 may correspond to a higher frequency of the frequency reference signal 18, and a lower voltage of the analog voltage signal 78 may correspond to a lower frequency of the frequency reference signal 18. However, the opposite may also be true, i.e. a lower voltage of the analog voltage signal 78 may correspond to a higher frequency of the frequency reference signal 18, and vice versa.

As described above, the analog voltage signal 78 is generated based upon the frequency reference signal 18 that is fed into the frequency counter 69. However, when the speed of the motor 14 is locked, the frequency signal 82 may be approximately equal to the frequency reference signal 18. Therefore, in an embodiment, the frequency signal 82 can be fed into the frequency counter 69 in place of the frequency reference signal 18. In such an embodiment, the analog voltage signal 78 may be generated based on the frequency signal 82 (i.e. based on the present frequency of the motor 14) rather than based on the external frequency reference signal 18.

The analog voltage signal 78 may be may be coupled to the control signal generator 34 and used by the control signal generator 34 to produce the PWM drive signal 36, as discussed below. Also, although described as an analog voltage signal 78, the signal 78 can be any type of appropriate signal including an analog signal, a digital signal, a PWM signal, etc.

In an embodiment, the electronic circuit 12 may also include an FG block 80. The FG block 80 may be a frequency generator that receives the filtered signal 32 and produces a frequency signal 82 that represents the current frequency (e.g. speed) of the motor 14. As noted above, the filtered signal 32 may be a filtered version of the back-EMF signals received from the motor 14. The FG block 80 may process or count the filtered signals 32 so that the frequency signal 82 represents the frequency of the filtered signal 32, and hence represents the frequency of the motor 14. The frequency signal 82 can be an analog signal, a digital signal, or any type of signal that can be used to regulate the speed of the motor 14.

A phase difference processor 84 receives the frequency signal 82 and the frequency reference signal 18, and generates a signal 86 representing a phase difference between the frequency of the motor 14 and the frequency reference signal 18. A closed loop controller 88 receives the signal 86 and produces a demand signal 90. The demand signal 90 may represent an amount of power to be applied to the motor 14. The closed loop controller 88 may provide the signal 90 in order to regulate the speed of the motor based on the signal 86 representing the phase difference between the motor 14 and the reference frequency 18. In an embodiment, the closed loop controller 88 may regulate the speed of the motor by initiating a phase lock, a speed lock, a frequency lock, or any other closed loop regulation scheme. In other embodiments, an open loop controller or any other way of regulating the speed of the motor may be used. In one example, a speed regulation scheme such as those described in U.S. patent application Ser. No. 13/595,430 (filed Aug. 20, 2012; incorporated here by reference in its entirety) may be used.

Figure 2:
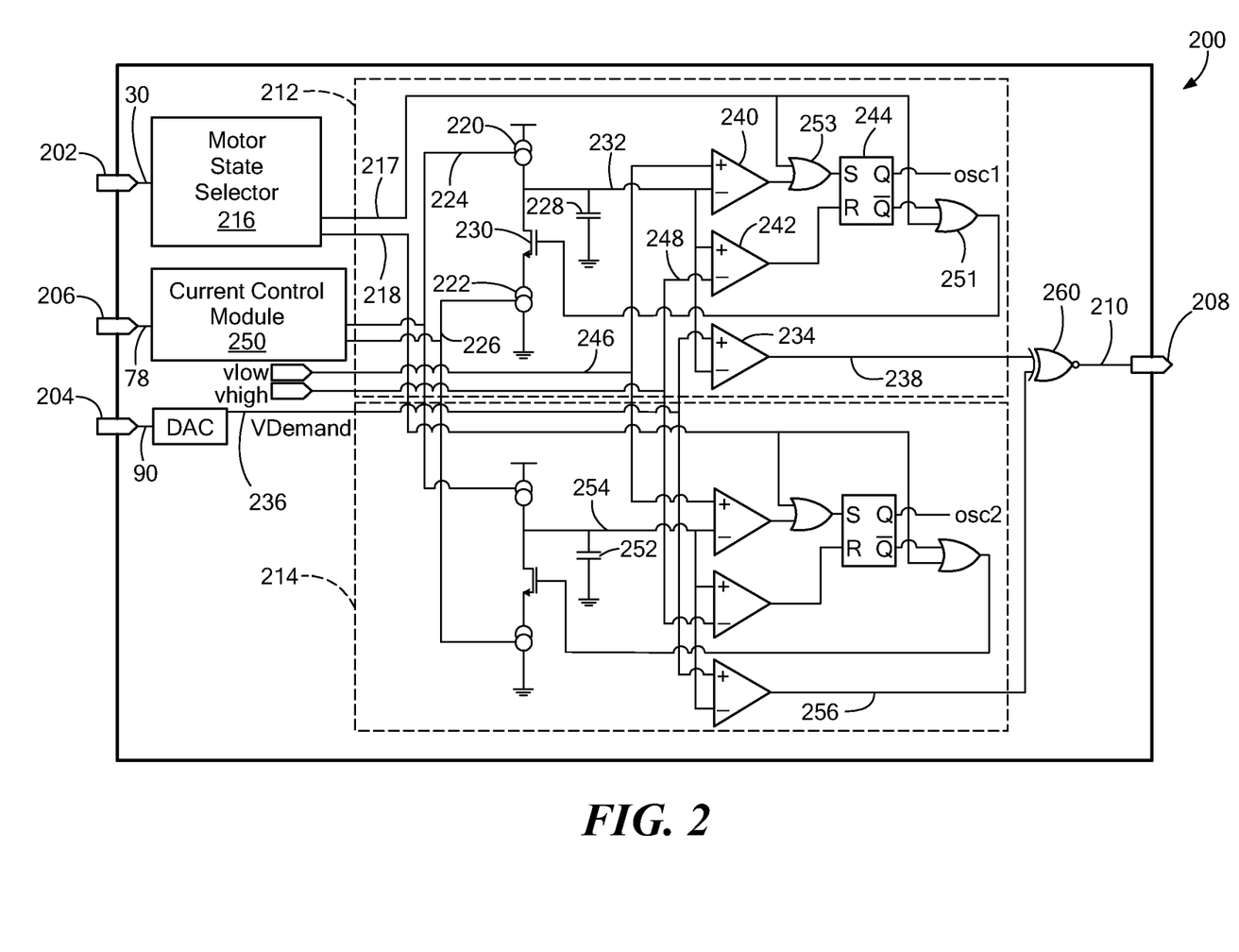
FIG. 2 is a circuit diagram of a PWM generator circuit for driving a motor.

Turning now to FIG. 2, PWM generator circuit 200 provides an example of a control signal generator, which may be the same as or similar to the control signal generator 34 (FIG. 1). In an embodiment, the PWM generator circuit 200 may include an input 202 for receiving the state or phase of the motor 14 (i.e. the input 202 may receive the filtered signal 30 representing the speed and/or position of the motor 14). The PWM generator circuit 200 may also include a demand input 204 for receiving a demand signal such as the demand signal 90 in FIG. 1. As noted the demand signal 90 may represent an amount of power to be applied to the motor 14. The PWM generator circuit 200 may also include a frequency input 206. The frequency input 206 may receive a signal such as signal 78 that represents the desired final speed of the motor 14.

The control signal generator 200 may also include an output 208, which may provide a pulse-width modulated output signal 210.

The control signal generator 200 is shown having two sub-circuits 212 and 214. In the embodiment shown, the sub-circuits 212 and 214 contain like elements and produce like outputs. However, this is not a requirement; the sub-circuits 212 and 214 may comprise different designs so long as they produce an appropriate pulse-width modulated output signal.

A motor state selector circuit 216 may control which of the sub-circuits 212 and 214 is operational, and which is in reset, via reset signals 217 and 218. In an embodiment, the motor state selector circuit 216 may hold the sub-circuit 214 in reset so it does not produce an output signal while the sub-circuit 212 is operational, and vice versa. The motor state selector circuit 216 may alternate which sub-circuit is in reset and which is operational each time the motor 14 changes phase. For example, during alternating phases of the motor 14, the sub-circuit 212 may be operational while the sub-circuit 214 may be held in reset, and during odd phases of the motor 14, the sub-circuit 212 may be held in reset while the sub-circuit 214 is operational.

Although not shown, the control signal generator 200 may contain additional sub-circuits that produce additional pulse-width modulated output signals. In such embodiments, the motor state selector circuit 216 may enable one sub-circuit at a time and enable each sub-circuit according to a schedule. For example, the sub-circuits may be enabled in an alternating, rotational, or round-robin scheme as the phase of the motor 14 changes.

For ease of discussion, the elements and operation of the sub-circuit 212 will be described. However, it will be understood that sub-circuit 214, or additional sub-circuits having similar components, may operate in a similar manner.

The sub-circuit 212 may comprise current sources 220 and 222. These current sources may, in an embodiment, be current-controlled current sources. For example, the current driven by current source 220 may be controlled by current signal 224, and the current driven by current source 222 may be controlled by current signal 226. An example of a current-controlled current source is a BJT transistor. However, other types of current-controlled current sources may also be used. Additionally, it is not necessary that current sources 220 and 222 be current-controlled. They may be voltage-controlled current sources, or current sources controlled by any other appropriate means known in the art.

In an embodiment, the current sources 220 and 222 can be replaced by any other circuit capable of charging or discharging the capacitor. For example, the current sources 220 and 222 could each by replaced by a resistor and a voltage source. The voltage produced by the voltage source can control the voltage across the resistor. Controlling the voltage across the resistor may control the rate of an electrical current flowing through the resistor, and thus control the rate at which the capacitor 228 charges or discharges. In such an embodiment, additional circuitry, such as a feedback controller that controls the voltage of the voltage regulator, may be employed to maintain a constant rate of charge or discharge of the capacitor 228.

The sub-circuit 212 may also include a capacitor 228 and a field-effect transistor (FET) 230. The FET 230 may act as a switch so that, when the FET 230 is opened, the current source 220 can charge the capacitor 228, and when the FET 230 is closed, the current sink 222 can discharge the capacitor 228.

As the capacitor 228 charges and discharge, a control signal 232 will rise and fall. In some embodiments, the control signal 232 will form a triangle wave, which will be discussed below. In other embodiments, the control signal 232 may form a sin wave, a sawtooth wave, a ramp, or any other shape that can be used to subsequently generate a PWM signal. In some embodiments, instead of a capacitor, a waveform generator (not shown) may be used to generate the control signal 232. The waveform generator may be a digital waveform generator, an analog waveform generator, etc.

The sub-circuit 212 may also comprise a comparator 234, which may receive the control signal 232 and a demand signal 236. The comparator may compare the two signals and produce a high output when the control signal 232 is higher than the demand signal 236 and a low output when the control signal 232 is lower than the demand signal 236. By comparing the control signal 232 to the demand signal 236, the sub-circuit 212 may produce a pulse width modulated output signal 238 having pulse widths that correspond to the demand signal 236.

The sub-circuit 212 may also comprise a comparator 240, a comparator 242, and a flip-flop 244. As shown, the comparator 240 may receive a low voltage reference signal 246 and the control signal 232 as inputs. The output of the comparator 240 may be fed into an input of the flip-flop 244. The comparator 242 may receive a high voltage reference signal 248 and the control signal 232 as inputs. The output of the comparator 242 may also be fed into an input of the flip-flop 244. The output of the flip-flop 244 is coupled to the gate of the FET 230 so that the output of the flip flop 244 will control when the FET 230 is opened and closed.

OR gates 251 and 253 are coupled to receive the reset signal 217 so that the motor state selector 216 can place the sub-circuit 212 in reset by asserting the reset signal 217. An XOR gate 260 can combine the PWM signals 238 and 256 to produce an output signal 210.

In operation, controlling the gate of the FET 230, the comparators 240 and 242, and the flip-flop 244 may act to produce an oscillator. For example, when the capacitor 228 is charging, the FET 230 will be open. Once the voltage across the capacitor 228 exceeds the high voltage threshold 248, the comparator 242 will assert its output, which will be fed into the flip-flop 244. This may cause the flip-flop 244 to subsequently toggle its output so that the FET 230 closes.

Once the FET 230 is closed, the capacitor 228 will begin to discharge and the voltage level of signal 232 will drop. Once this voltage 232 drops below the low voltage threshold 246, the comparator 240 will assert its output. This may cause the flip-flop 244 to once again toggle its output and close the switch 230, which allows the capacitor 228 to begin charging once again. This cycle may continue whenever the sub-circuit 212 is not in reset.

The rate at which the capacitor 228 charges, and thus the frequency of the pulse-width modulated signal, is controlled by the magnitude of the current that is sourced to the capacitor 228 by current source 220 and the magnitude of the current that is sinked from the capacitor 228 by current sink 222.

In order to control these currents, the PWM generator circuit 200 may include a current control module 250. The current control module 250 may receive the signal 78 (i.e. a signal indicative of the frequency of the motor 14) from timing input 206. The signal 78 may be an analog or digital signal representing the present speed, frequency, or frequency of the motor 14. For example, if the speed of the motor 14 is high, the value of the signal 78 may be high. Conversely, if the speed of the motor 14 is low, the value of the signal 78 may be low.

Based on the value of the signal 78, and thus based on the frequency of the motor, the current control module 250 may generate an output signal 224 to control the magnitude of the current sourced by the current source 220, and an output signal 226 to control the magnitude of the current sunk by the current sink 222. By controlling the speed at which the capacitor 228 charges, and thus controlling the frequency of the control signal 232, the PWM generator circuit 200 can control the frequency and period of PWM drive signal 238 by controlling the rate of oscillation caused by the comparators 240 and 242 and the flip-flop 244. For example, if the capacitor 228 charges and discharges relatively quickly, the comparators 240 and 242 will trip quickly, the comparator 234 will toggle more quickly, and thus the frequency of the output signal 238 will be high. If the capacitor 228 charges and discharges relatively slowly, the comparators 240 and 242 will trip more slowly, the output of the comparator 234 will toggle more slowly, and thus the frequency of the output signal 238 will be lower.

In other embodiments, the capacitor 228 and/or the capacitor 252 may be replaced by a plurality of capacitors connected in parallel to control the frequency of the control signal 232 (or 254). Each capacitor in the plurality of capacitors may be coupled to a switching device such as a MOSFET (not shown). The switching devices may selectively couple the signal 232 (or 254) to each capacitor or to multiple capacitors in the plurality of capacitors. In this embodiment, the capacitors may be switched in and out of the circuit by the switching devices in order to change the total capacitance seen by the signal 232 (or 254), and thus control the rise time, fall time, and/or frequency of the signal 232 (or 254). Changing the total capacitance in this way may control the rate at which the capacitors charge and discharge. For example, a relatively large capacitance may cause the capacitors to charge relatively slowly and a relatively smaller capacitance may cause the capacitors to charge relatively quickly. In embodiments, the capacitors may be coupled in parallel, in series, or in a combination of parallel and series connections.

Accordingly, the current control module 250 can modify the frequency of the PWM drive signal 238 so that the frequency of the PWM drive signal 238 corresponds to or is based upon the frequency of the phases of the motor 14. For example, the current control module 250 can modify the frequency of the PWM drive signal 238 so that the period of the PWM drive signal 238 is a multiple of the period of the phase of the motor, i.e. so that multiple PWM pulses occur during a single phase of the motor. In various embodiments, the number of PWM pulses that occur on the output signal 238 may be one, two, three, four, or five pulses for every phase of the motor 14. In other embodiments, the number of PWM pulses per motor phase may be any desired number.

In an embodiment, the current control module 250 may set its outputs so that the current sinked by the current sink 222 is twice the magnitude of the current sourced by the current source 220. In such an embodiment, the capacitor 228 can be charged and discharged without the need to turn current source 220 off. For example, when the FET 230 is open, the current source 220 will charge the capacitor 228. When the FET 230 is closed, because the current sinked by the current sink 222 is twice the current sourced by the current source 220, the current sink 222 will be able to discharge the capacitor 232 and sink the current from the current source 220 at the same time.

By modifying the frequency of the pulses on the PWM drive signal 238, the current control module 250 can minimize the occurrence of a short pulse on the PWM drive signal 238. As discussed above, the motor state selector circuit 216 may hold sub-circuit 214 in reset while sub-circuit 212 is operating, and vice versa. Once the phase of the motor 14 changes, the motor state selector circuit 216 may place the sub-circuit 212 in reset. If the sub-circuit 212 is placed in reset during a pulse on the PWM drive signal 238, then it may result in an incomplete or short pulse on the PWM drive signal 238.

Figure 3A:
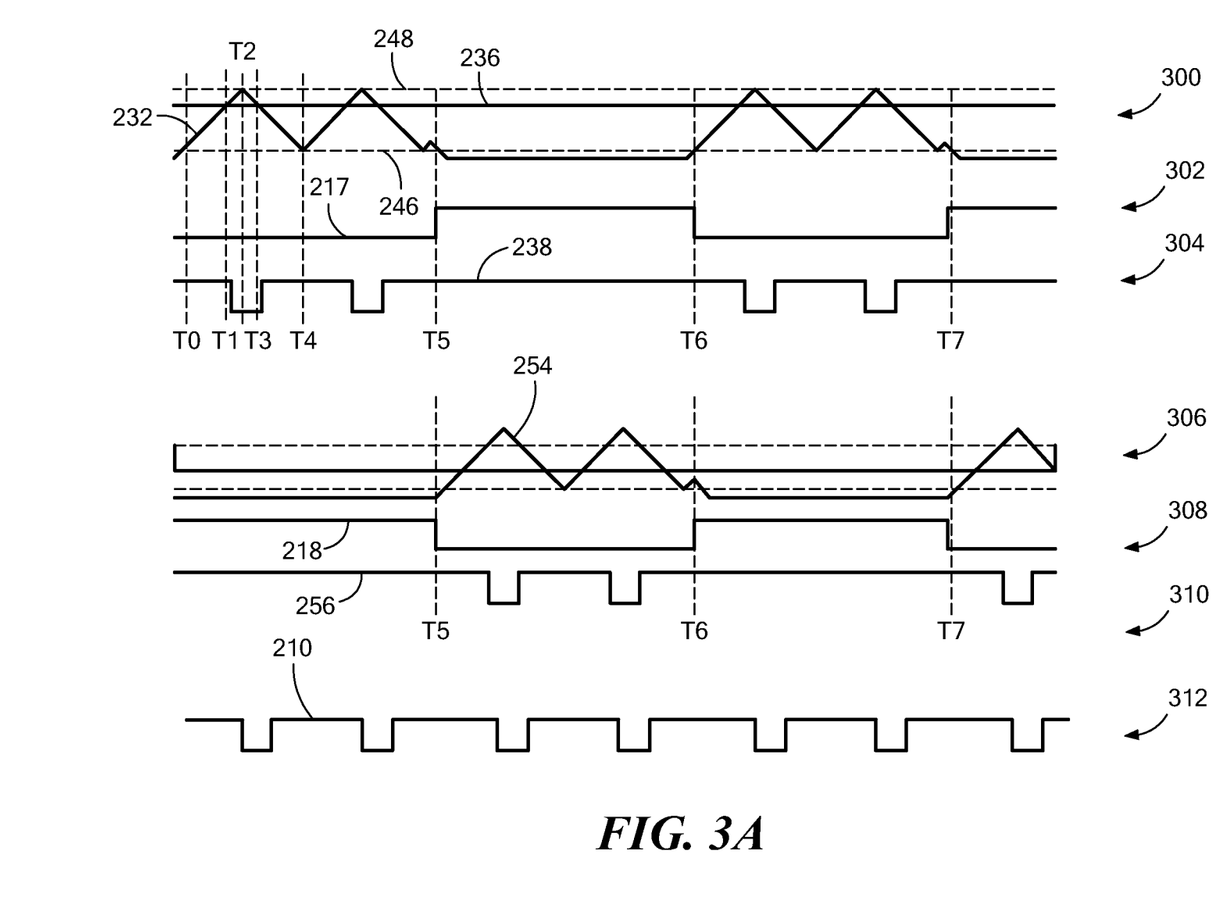
FIG. 3A is a series of waveforms that may be generated by an electronic circuit for driving a motor.

Referring now to FIG. 3A, a series of graphs are shown. In each graph, the horizontal axis represents time and the vertical axis represents voltage. In an embodiment, graphs 300, 302, and 304 may be associated with the sub-circuit 212. Graph 300 may represent the control signal 232 (i.e. the voltage across the capacitor 228), graph 302 may represent the reset signal 217, and the graph 304 may represent the PWM drive signal 238 of the sub-circuit 212. Also shown is the high voltage threshold 248, the low voltage threshold 246, and the demand signal 236.

At time T0, the FET 230 is open and the capacitor 228 begins to charge. This will cause the control signal 232 to increase, as shown by the rising slope of graph 300 between times T0 and T2. Once the control signal 232 (graph 300) crosses the demand threshold 236 at time T1, the PWM drive signal 238 (graph 306) may toggle. When the control signal 232 reaches or crosses the high voltage threshold 248 at time T2, the FET 230 will close and the capacitor will begin to discharge, as illustrated by the falling slope of the graph 300 between times T2 and T4. When the voltage across the capacitor reaches or crosses the demand signal 236, the PWM drive signal 238 may once again toggle, as shown at time T3. At time T4, when the voltage at node 232 reaches or crosses the low voltage threshold 246, the FET 230 may once again open and the cycle above may repeat.

The reset signal 217 may correspond to the phase of the motor 14. In other words, a particular phase of the motor 14 may begin at time T0, when the reset signal 217 is de-asserted, and end at time T5, when the reset signal 217 is asserted. As shown in FIG. 3A, when the reset signal 217 asserts at time T5, the output signal 238 is not in the middle of a pulse. This may be accomplished by setting the charge and discharge rate of the capacitor 228, i.e. by controlling how quickly the graph 300 rises and falls, so that the graph 300 does not trigger a pulse on the PWM drive signal 238 at time T5. As noted above, the charge and discharge rate of the capacitor 228 can be controlled by the current control module 250.

Setting the frequency of the graph 300 to correspond to the duration of the phase of the motor 14 can act to reduce the occurrence of an incomplete pulse (i.e. a short pulse) on the PWM drive signal 238. If, for example, the reset signal 217 is asserted during a pulse on the PWM drive signal 238, the reset signal 217 may cause the pulse to be immediately de-asserted, which can shorten the length of the pulse. In many instances, an incomplete pulse may be undesirable because it can cause motor jitter if it flows through to the motor 14. By setting the frequency of the control signal 232 to correspond to the phase of the motor 14, so that pulses do not occur when the reset signal 217 is asserted, the occurrence of incomplete pulses on the PWM drive signal 238 can be reduced.

In an embodiment, the frequency or period of the control signal 232 can be a multiple of the duration of a phase of the motor 14. For example, as shown in FIG. 3A, the frequency of signal 232 is set so that about two cycles occur on the control signal 232 for each cycle of the reset signal 217. However, the frequency can be set so that the frequency or period of the control signal 232 is any multiple of the duration of the motor 14. In some embodiments, the number of cycles of the control signal 232 that occur during a phase of the motor 14 may be an integer number. In other embodiments, the number of cycles of the control signal 232 that occur during a phase of the motor 14 may be an fractional number, or a non-integer number. For example, in various embodiments, there may be ⅐, ⅓, ½, one, two, three, four, five, six, etc., cycles of the graph 300 for every phase of the motor 14.

In an embodiment, as the duration of the phase of the motor 14 changes, the number of cycles of the control signal 232 may remain the same. For example, assume that the number of cycles of the signal 300 is two cycles per motor phase. As the motor 14 speeds up, the duration of the motor phase will become shorter. In this case, the current control module 250 may modify the rate that the capacitor is charged and discharged, so that capacitor is charged and discharged more quickly, the frequency of the control signal 232 increases, and the number of cycles per motor phase remains two. By modifying the frequency of the control signal 232 so that it corresponds to the changing duration of the phases of the motor 14, the PWM generator circuit 200 can reduce the occurrence of an incomplete pulse on the PWM drive signal 238.

FIG. 3A also includes three graphs 306, 308, and 310, which may be associated with the sub-circuit 214. For example, the graph 306 may represent the voltage across the capacitor 252 (i.e. the control signal 254). The graph 308 may represent the reset signal 218. And the graph 310 may represent the PWM drive signal 256.

The reset signals 217 and 218 in FIG. 3A may represent phases of the motor 14. For example, the time between T0 and T5, when the reset signal 217 (graph 302) is de-asserted, may represent a first phase of the motor 14, and the time between T5 and T6, when the reset signal 218 is de-asserted (graph 306), may represent a second phase of the motor 14. The time between T6 and T7, when the reset signal 218 is once again asserted and the reset signal 217 is once again de-asserted, may represent a third phase of the motor 14. In an embodiment, the motor 14 may have one, two, three, four, six, eight, or any number of phases, which may repeat as the motor 14 turns.

As noted above, the motor state selector circuit 216 may alternate or cycle through which sub-circuits are operating, and which sub-circuits are in reset, based on the phase of the motor 14. As shown in FIG. 3A, during the first phase of the motor, the sub-circuit 212 is operating and the sub-circuit 214 is in reset, as shown by the pulses on the PWM drive signal 238 between times T0 and T5. During the second phase of the motor, the sub-circuit 212 is in reset and the sub-circuit 214 is operating, as shown by the pulses on the PWM drive signal 256. During the third phase of the motor, the sub-circuit 212 is once again operating and the sub-circuit 214 is once again in reset, as shown by the pulses on the PWM drive signal 238 between times T6 and T7.

If the PWM generator circuit 200 has two or more sub-circuits that generate PWM drive signals, the PWM generator circuit 200 may alternate between, or may cycle through which sub-circuits are in reset as the phases of the motor 14 change. In FIG. 3A, graphs generated by two sub-circuits (i.e. sub-circuits 212 and 214) are shown. However, if the PWM generator circuit 200 has more sub-circuits, the PWM generator circuit 200 can enable and disable the sub-circuits in any appropriate manner or order. In an embodiment, the PWM generator circuit 200 may enable the sub-circuits in an alternating fashion, a round-robin fashion, etc.

The PWM drive signals 238 and 256 (and any PWM drive signals produced by any additional sub-circuits) may be combined to produce a PWM driver signal 210 that does not include any incomplete pulses, as shown by graph 312. For example, graph 312 may represent the PWM drive signal 210, which is the output of the XOR gate 260 that combines the PWM drive signals into the combined PWM drive signal 210 (FIG. 2).

Figure 3B:
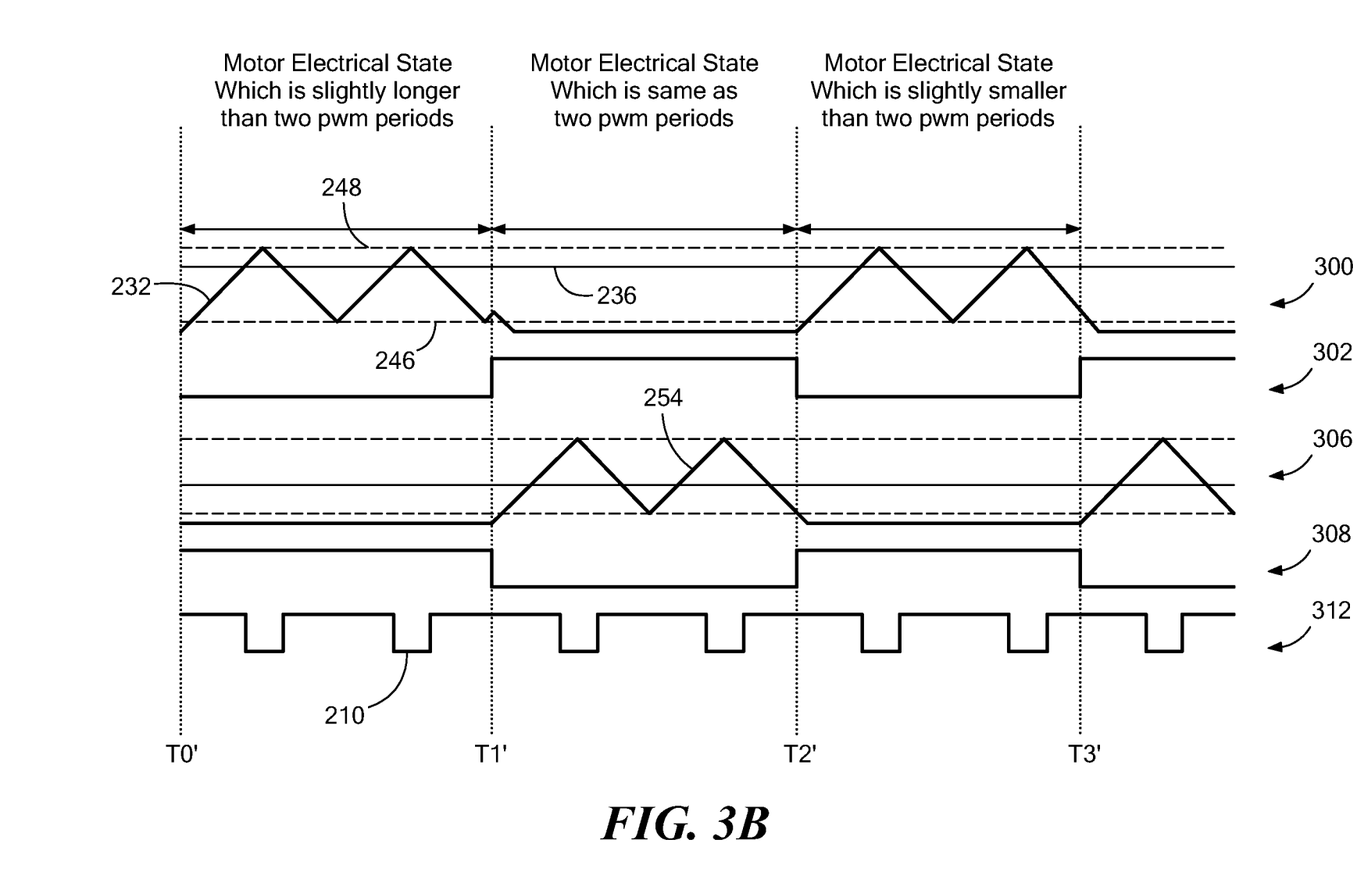
FIG. 3B is a series of waveforms that may be generated by an electronic circuit for driving a motor.

FIG. 3B shows the same or similar waveforms 300, 302, 306, 308, and 312 that are shown in FIG. 3A. However, the timing of the motor phases is slightly changed in FIG. 3B. As the motor 14 spins and is regulated, the duration of the phases of the motor may change slightly, and thus the phases of the motor may change in duration. This change in duration is illustrated in FIG. 3B. For example, the phase of the motor between time T0' and T1' may be slightly longer than two PWM cycles of the control signal 232, the phase of the motor between times T1' and T2' may be equal to two PWM cycles of the control signal 232, and the phase of the motor between times T2' and T3' may be slightly less than two PWM cycles of the control signal 232.

When the motor 14 is being regulated at its final speed, the duration of the motor phases may be relatively consistent, but may be subject to some variation, as shown in FIG. 3B. In the presence of this variation, it may be desirable to switch between which signal is used to generate the PWM output signal 210.

For example, during the motor phase between time T0' and T1', pulses on the PWM output signal 210 may be generated by the control signal 232. However, as shown in FIG. 3B, at time T1' when the phase of the motor 14 changes, the control signal 232 may be rising. However, the control signal 254 is in reset prior to time T1' (as described above) and at time T1' it is ready to be used. (In other words, the circuitry that generates the control signal 254 may be in reset). Therefore, in an embodiment, the PWM generator circuit 200 may take the control signal 254 out of reset at time T1' so that it can be used to generate the pulses on the PWM output signal 210 during the second phase of the motor 14. This may allow the PWM generator circuit 200 to precisely control the number of pulses that occur during the second phase of the motor 14 in the presence of variations of the duration of the phase of the motor 14.

Similarly, at time T2', the motor 14 may enter a third motor phase. Prior to time T2', the control signal 254 may be used to generate the pulses on the PWM output signal 210 and the control signal 232 may be in reset and ready to be used. Therefore, at time T2', the motor may place the control signal 254 in reset and may take the control signal 232 out of reset so that the control signal 232 can be used to generate the pulses on the PWM output signal 210 between time T2' and T3'.

Similarly, at time T3', the motor 14 may enter a fourth motor phase. Prior to time T3', the control signal 232 may be used to generate the pulses on the PWM output signal 210 and the control signal 254 may be in reset and ready to be used. Due to the variations in duration of motor phases, the control signal 254 may be falling at time T3' when the motor 14 enters the fourth phase. Therefore, at time T3', the motor may place the control signal 254 in reset and may take the control signal 232 out of reset so that the control signal 232 can be used to generate the pulses on the PWM output signal 210 between time T2' and T3'.

Figure 4:
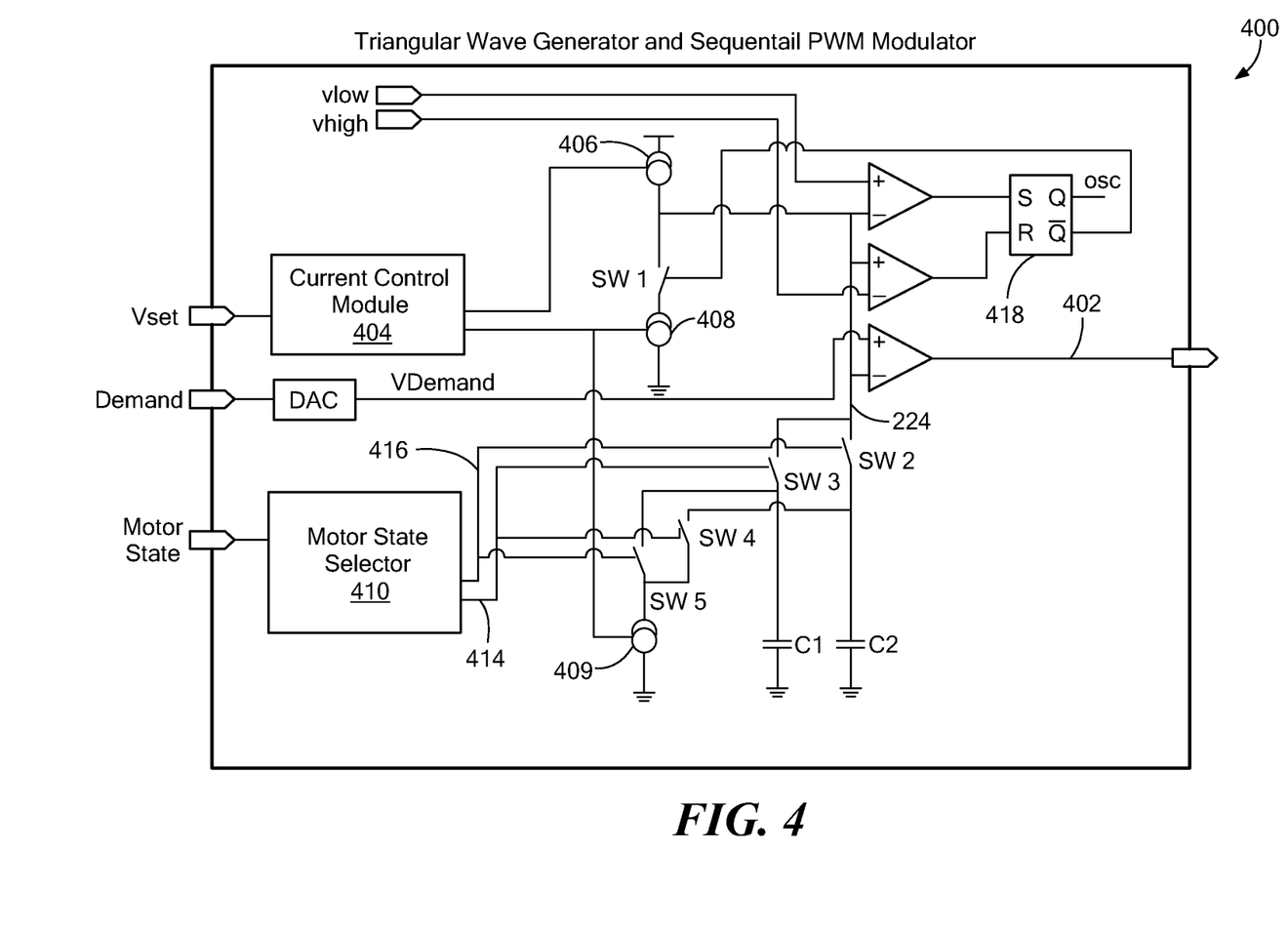
FIG. 4 is a circuit diagram of a PWM generator circuit for driving a motor.

Referring now to FIG. 4, an embodiment of a PWM generator circuit 400 is shown, which may be the same as or similar to the PWM generator circuit 34 (FIG. 1). In contrast to the PWM generator circuit 200, the control signal generation circuit 400 reduces the amount of hardware for producing a PWM drive signal 402. For example, the PWM generator circuit 200 in FIG. 2 uses redundant sub-circuits 214 and 214, which include capacitors, current supplies, comparators, etc. in order to generate a first PWM signal 238 and a second PWM signal 256. These signals 238 and 256 are then combined by an XOR gate 260 to produce the PWM output signal 210.

Instead of using redundant sub-circuits for generating a PWM drive signal 402, the PWM generator circuit 400 employs a current control module 404, which may use two or more capacitors (i.e. C1 and C2 in FIG. 4) and a series of switches to generate the PWM output signal 402. As the phase of the motor 14 changes, the PWM generator circuit 400 may open and close the switches so that, during some phases of the motor 14, the capacitor C1 is charged and discharged in order to generate the PWM output signal 402, and in alternating phases of the motor 14, the capacitor C2 is charged and discharged in order to generate the PWM output signal 402. The PWM generator circuit 400 can effectively hold one capacitor C1 or C2 in reset while the other is being used, and switch between them as needed. This can allow the PWM generator circuit 400 to maintain a "ready" capacitor that can be used once the phase of the motor 14 changes The PWM generator circuit 400 may also include a motor state selector circuit 410, which, based on the phase of the motor 14, may generate a reset signal 414 and a reset signal 416. The reset signal 414 and the reset signal 416 may control the switches SW1, SW2, SW3, SW4, and SW5. As these switches open and close, the current sources 406, 408, and 409 will source and sink current to capacitors C1 and C2 in order to generate an oscillating graph.

In an embodiment, in order to switch between using the capacitor C1 and C2 to generate the PWM output signal 402, the PWM generator circuit 400 may employ a switching sequence as follows:

During a first phase of the motor 14, the signal Reset1 may begin in a low state, and the signal Reset2 may begin in a high state. While in these states, the switches SW2, SW3, SW4, and SW5 are configured so that the capacitor C2 is disconnected from current sources 406 and 408 and is discharged by current sink 409, and so that capacitor C1 is being charged and discharged by the current sources 406 and 408.

When the voltage on the capacitor C1 is greater than the vhigh signal, the output of the flip flop 418 toggles and closes the switch SW1, which discharges the capacitor C1.

When the voltage on the capacitor C1 is lower than the vlow signal, the output of the flip flop 418 toggles and opens the switch SW1, which allows the capacitor C1 to be charged by the current source 406.

When the phase of the motor 14 changes, the motor state selector 410 places the signal Reset1 into a high state and the signal Reset2 into a low state. While in these states the switches SW2, SW3, SW4, and SW5 are configured to disconnect and discharge the capacitor C1 while allowing the capacitor C2 to be charged and discharged by the current sources 406 and 408.

When the voltage on the capacitor C2 is greater than the vhigh signal, the output of the flip flop 418 toggles and closes the switch SW1, which discharges the capacitor C2.

When the voltage on the capacitor C2 is lower than the vlow signal, the output of the flip flop 418 toggles and opens the switch SW1, which allows the capacitor C1 to be charged by the current source 406.

When the phase of the motor 14 subsequently changes, the cycle described above can continue.

Figure 5:
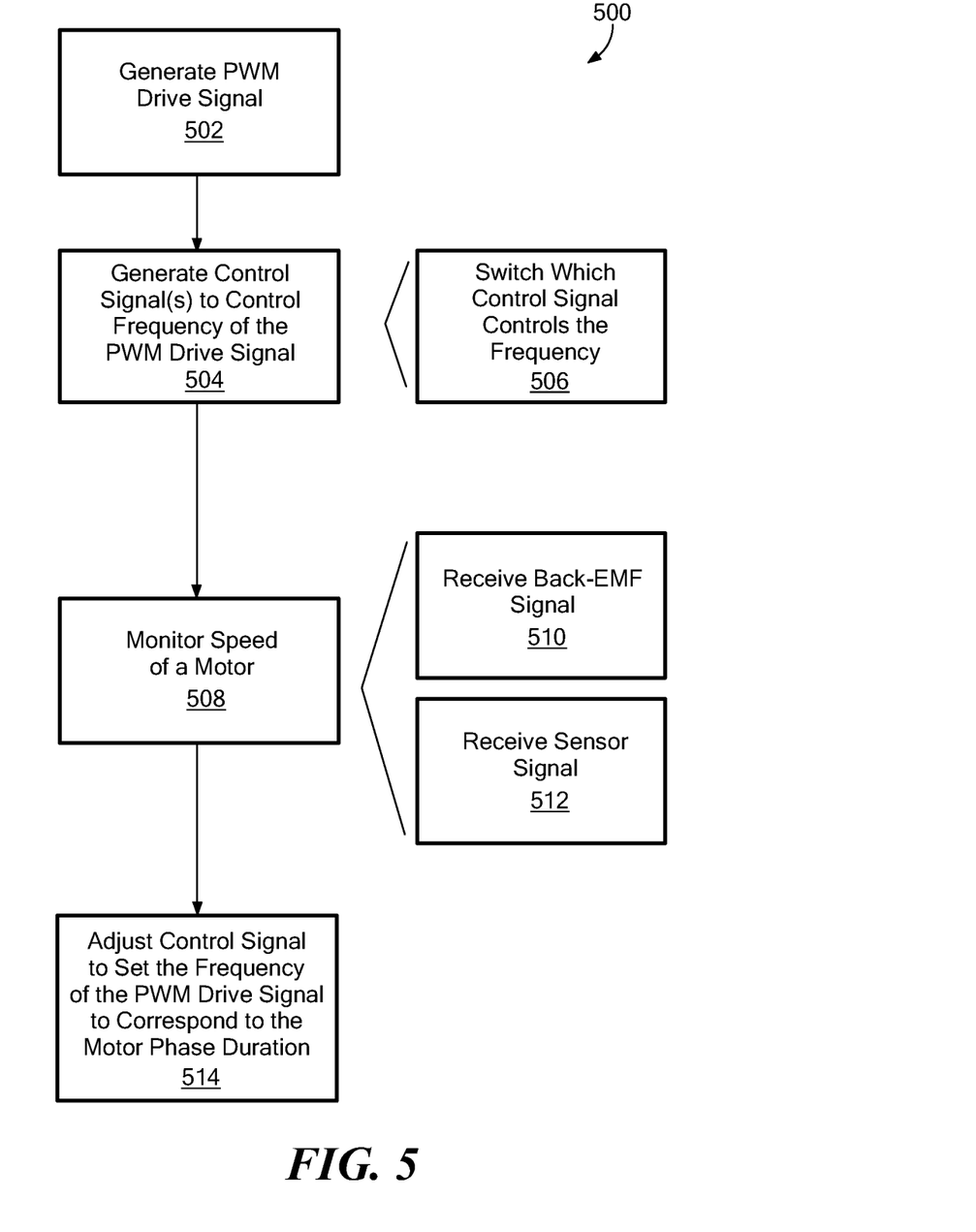
FIG. 5 is a flowchart of a process for driving a motor.

Referring now to FIG. 5, a flowchart illustrates a process 500 for driving a motor. The process 500 may be implemented, in whole or in part, by an electronic circuit such as the electronic circuit 10. The process 500 may also be implemented, in whole or in part, by other circuits, by software, by a combination of circuits and software, or by any other appropriate means in the art.

As shown by box 502, the process 500 may generate a PWM drive signal, such as the PWM drive signal 238, the PWM drive signal 256, the PWM drive signal 210, and the like. The process 500 may also generate one or more control signals to control the frequency of the PWM drive signal, as shown by box 504. In embodiments of the process, the control signal(s) may be generated by one or more sub-circuits, and the process 500 may alternate between which sub-circuit is used to control the frequency of the PWM drive signal. The process 500 may alternate between two or more sub-circuits, and may employ a scheduling scheme such as a round robin, or any other scheme for driving the motor 14. In an embodiment, the process 500 may switch between which sub-circuit is controlling the frequency of the PWM drive signal when a phase of the motor 14 changes, as shown by box 506.

The process 500 may also monitor the duration of the phases of the motor, as shown by box 508. In order to monitor the duration, the process may receive a back-EMF signal from the motor 14 as shown by box 510 and/or may receive a signal from a sensor (i.e. magnetic field sensor, a resolver, etc) as shown by box 512.

The process 500 may also set the frequency of the PWM drive signal to correspond to the duration of the phase of the motor, as shown by box 514. In an embodiment, the process 500 can set the frequency by directly computing the frequency with a circuit or software that, or by providing an oscillating control signal as described above. The frequency may be set so that a single pulse or multiple pulses occur on the PWM drive signal for each phase of the motor 14. In an embodiment, the number of pulses that occur on the PWM drive signal during a phase of the motor 14 may be a fixed number. In some embodiments, the number of pulses that occur on the PWM drive signal during a phase of the motor 14 may be an integer number. In other embodiments, the number of pulses that occur on the PWM drive signal during a phase of the motor 14 may be a variable and/or non-integer number, and may change in response to the phase of the motor, to the amount of power to be applied to the motor, to the desired frequency of the motor, etc.

As described above, in order to reduce the occurrence of an incomplete pulse on the PWM output signal, the frequency of the pulses may be set so that a pulse does not occur during the assertion of a reset signal, or at a point in time where the phase of the motor 14 is changing. Controlling the frequency as described above, and reducing the occurrence of short pulses, can reduce motor jitter. For example, a conventional motor driver, when controlling a high precision motor, may result in 3%-6% motor jitter. However, by utilizing embodiments of the invention, motor jitter when controlling a high precision motor may be reduced to 3% or less, 2% or less, 1% or less, etc. Embodiments of the invention, when used with other types of motors (e.g. non-precision motors) can also reduce motor jitter.

One skilled in the art will recognize that, although certain signals may be described above as digital signals or analog signals, this is not intended to be a limitation. In various embodiments, the digital signals described above can be replaced by equivalent analog signals and vice versa. Similarly, components described above as receiving or producing a digital signal or an analog signal may be replaced by equivalent components that receive or produce analog signals, digital signals, or other types of signals.

Having described various embodiments, which serve to illustrate various concepts, structures and techniques, which are the subject of this patent, it will now become apparent to those of ordinary skill in the art that other embodiments incorporating these concepts, structures and techniques may be used. Accordingly, the scope of the patent should not be limited to the described embodiments but rather should be limited only by the spirit and scope of the following claims.

What is claimed is:

1. A method of driving a motor comprising:
generating a drive signal to a motor for controlling power to the motor;
generating a control signal to control a frequency of the drive signal;
monitoring a speed of the motor;
adjusting the control signal, based on the speed of the motor, to set the frequency of the drive signal to a value associated with a duration of a phase of the motor, so as to reduce the occurrence of an incomplete pulse on the drive signal; and
generating pulses on the drive signal by toggling the drive signal when the control signal crosses a threshold.

2. The method of claim 1 wherein the drive signal is a pulse-width modulated (PWM) signal.

3. The method of claim 1 wherein the threshold is a variable threshold for controlling widths of the pulses.

4. The method of claim 1 further comprising setting a frequency of the pulses to a value that causes from about two to about six pulses to be produced on the pulse-width modulated drive signal during each phase of the motor.

5. The method of claim 1 wherein adjusting the frequency includes controlling the rate at which an electrical current charges a capacitor.

6. The method of claim 1 wherein adjusting the frequency includes selectively coupling one or more capacitors to the control signal to control the rate at which the control signal rises and falls.

7. The method of claim 1 wherein monitoring the speed of the motor includes receiving a commutation signal from one of: a back-EMF signal from the motor, a signal from a magnetic field sensor, and a signal from a resolver.

8. The method of claim 7, wherein the magnetic field sensor comprises one or more of:
   a Hall effect element,
   a magentoresistance element, and
   a magnetotransistor.

9. The method of claim 1 wherein the control signal is a triangle wave signal.

10. An apparatus for driving a motor comprising:
    a drive signal generation circuit configured to produce pulses on a drive signal in response to a control signal;
    a detection circuit coupled to receive a commutation signal from the motor and monitor a speed of the motor; and
    a control signal generation circuit configured to dynamically generate a control signal, in response to the monitored speed of the motor, so that that a frequency of the drive signal is associated with a duration of a phase of the motor, so as to reduce an occurrence of an incomplete pulse on the drive signal;
    wherein the drive signal generator circuit is configured to produce the pulses on the drive signal by toggling the drive signal when the control signal crosses a threshold.

11. The apparatus of claim 10 wherein the drive signal is a pulse-width modulated (PWM) drive signal.

12. The apparatus of claim 10 wherein the threshold is a variable threshold for controlling the width of pulses on the drive signal.

13. The apparatus of claim 10 wherein the control signal generation circuit is configured to dynamically set a frequency of the drive signal so that a predetermined number of pulses occur on the drive signal during the duration of the phase of the motor.

14. The apparatus of claim 10 wherein the control signal generation circuit is configured to set the frequency by controlling the rate at which an electrical current charges a capacitor.

15. The apparatus of claim 14 wherein the control signal generation circuit is configured to set the frequency by controlling an amount of current flowing into and out of the capacitor.

16. The apparatus of claim 10 wherein the commutation signal is one of:
    a back-EMF signal from the motor;
    a signal produced by a magnetic field sensor; and
    a signal produced by a resolver.

17. The apparatus of claim 16, wherein the magnetic field sensor comprises one or more of:
    a Hall effect element,
    a magentoresistance element, and
    a magnetotransistor.

18. The apparatus of claim 10 wherein the control signal is one of: a triangle wave, a ramp signal, and a calculated signal.

19. A method of driving a motor comprising:
    generating a drive signal to a motor for controlling power to the motor;
    generating a control signal to control a frequency of the drive signal;
    monitoring a speed of the motor; and
    adjusting the control signal, based on the speed of the motor, to set the frequency of the drive signal to a value associated with a duration of a phase of the motor, so as to reduce the occurrence of an incomplete pulse on the drive signal;
    wherein the frequency is set to a value that reduces the occurrence of an incomplete pulse by reducing the occurrence of the pulse-width modulated drive signal being asserted at a time when the phase of the motor ends.

20. A method of driving a motor comprising:
    generating a drive signal to a motor for controlling power to the motor;
    generating a control signal to control a frequency of the drive signal;
    monitoring a speed of the motor;
    adjusting the control signal, based on the speed of the motor, to set the frequency of the drive signal to a value associated with a duration of a phase of the motor, so as to reduce the occurrence of an incomplete pulse on the drive signal;
    generating one or more additional control signals for generating the pulses on the drive signal; and
    when the phase of the motor changes, alternating between which control signal is used to generate the pulses on the pulse-width modulated drive signal.

21. An apparatus for driving a motor comprising:
    a drive signal generation circuit configured to produce pulses on a drive signal in response to a control signal;
    a detection circuit coupled to receive a commutation signal from the motor and monitor a speed of the motor; and
    a control signal generation circuit configured to dynamically generate a control signal, in response to the monitored speed of the motor, so that that a frequency of the drive signal is associated with a duration of a phase of the motor, so as to reduce an occurrence of an incomplete pulse on the drive signal;
    wherein the control signal generation circuit is configured to set a frequency of the drive signal value that reduces motor jitter by reducing the occurrence of an incomplete pulse on the drive signal.

22. An apparatus for driving a motor comprising:
    a drive signal generation circuit configured to produce pulses on a drive signal in response to a control signal;
    a detection circuit coupled to receive a commutation signal from the motor and monitor a speed of the motor; and
    a control signal generation circuit configured to dynamically generate a control signal, in response to the monitored speed of the motor, so that that a frequency of the drive signal is associated with a duration of a phase of the motor, so as to reduce an occurrence of an incomplete pulse on the drive signal;
    wherein the control signal generation circuit is configured to set a frequency of the pulses to a value that reduces an occurrence of a pulse occurring on the drive signal at a time when the phase of the motor changes.

23. An apparatus for driving a motor comprising:
    a drive signal generation circuit configured to produce pulses on a drive signal in response to a control signal;
    a detection circuit coupled to receive a commutation signal from the motor and monitor a speed of the motor;
    a control signal generation circuit configured to dynamically generate a control signal, in response to the monitored speed of the motor, so that that a frequency of the drive signal is associated with a duration of a phase of the motor, so as to reduce an occurrence of an incomplete pulse on the drive signal; and
    one or more additional drive signal generation circuits for generating the pulses on the pulse-width modulated drive signal;
    wherein the driver signal generator circuit is configured to alternate between which control signal is used to generate the drive signal.

24. The apparatus of claim 23 further comprising a switching circuit configured to hold in reset the control signals that are not being used to generate the drive signal.

* * * * *

UNITED STATES PATENT AND TRADEMARK OFFICE
CERTIFICATE OF CORRECTION

| | |
|---|---|
| PATENT NO. | : 9,088,233 B2 |
| APPLICATION NO. | : 13/718549 |
| DATED | : July 21, 2015 |
| INVENTOR(S) | : William Boyd Alcorn et al. |

It is certified that error appears in the above-identified patent and that said Letters Patent is hereby corrected as shown below:

In the Drawings:

Sheet 6/7, FIG. 4 (box 400) delete "Sequentail" and replace with --Sequential--.

In the Specification:

Column 5, line 1 delete "Vreg" and replace with --VREG--.

Column 5, line 9 delete "{?}".

Column 5, line 35 delete "example" and replace with --example.--.

Column 5, line 59 delete "electric the motor" and replace with --electric motor--.

Column 5, line 64 delete "electric the motor" and replace with --electric motor--.

Column 7, line 46 delete "78 may be may be coupled" and replace with --78 may be coupled--.

Column 10, line 34 delete "current sunk" and replace with --current sink--.

Column 14, line 47 delete "changes" and replace with --changes.--.

Column 15, line 29 delete "electronic circuit 10" and replace with --electronic circuit 12--.

Signed and Sealed this
Seventeenth Day of May, 2016

Michelle K. Lee
*Director of the United States Patent and Trademark Office*